Sept. 28, 1926.

M. ADAIR 1,600,966

ADVERTISING DEVICE

Filed July 14, 1924          3 Sheets-Sheet 2

Inventor,
Montague Adair,
By M. H. Longhridge Atty.

Sept. 28, 1926.

M. ADAIR 1,600,966

ADVERTISING DEVICE

Filed July 14, 1924      3 Sheets-Sheet 3

Inventor,
Montague Adair
By M. A. Loughridge, Attorney.

Patented Sept. 28, 1926.

1,600,966

UNITED STATES PATENT OFFICE.

MONTAGUE ADAIR, OF NEW YORK, N. Y.

ADVERTISING DEVICE.

Application filed July 14, 1924. Serial No. 726,051.

Figure 1:
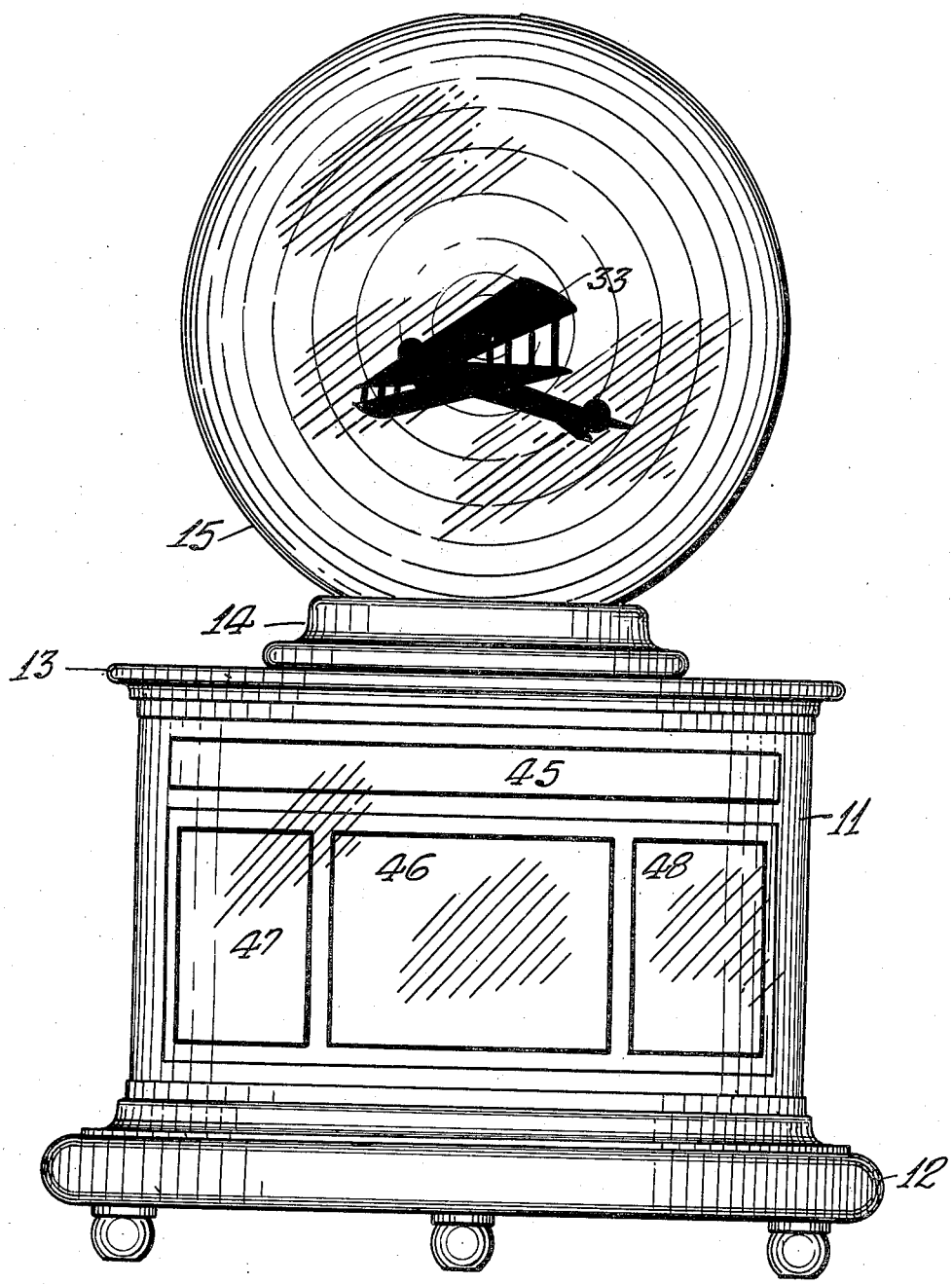
Figure 2:
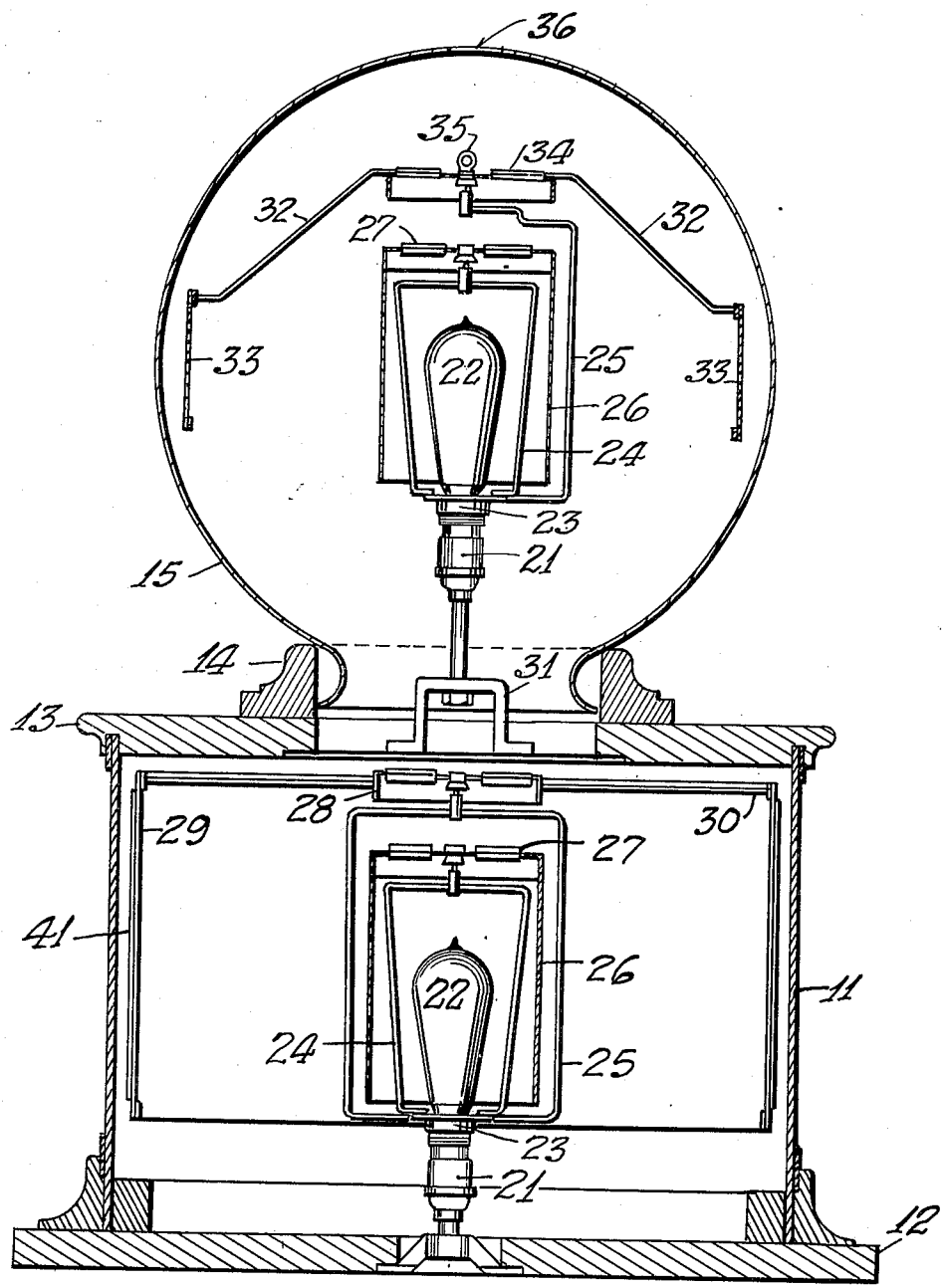
Figure 3:
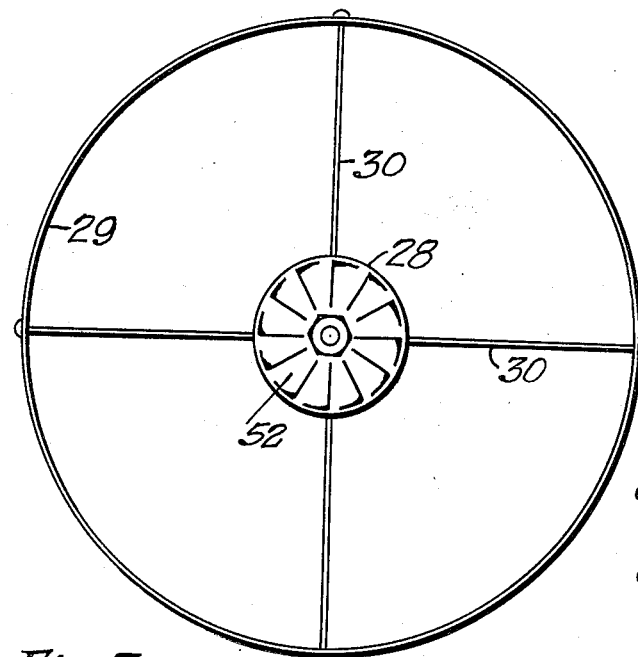
Figure 6:
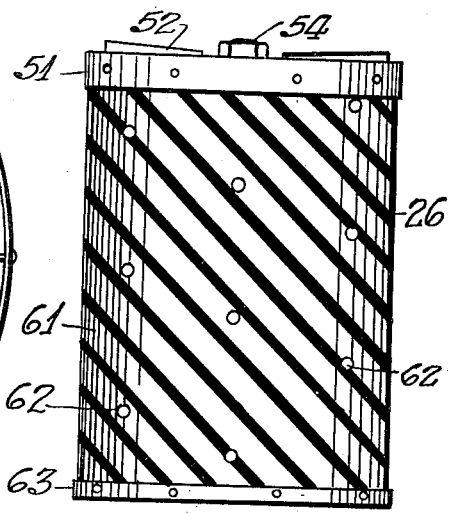
Figure 4:
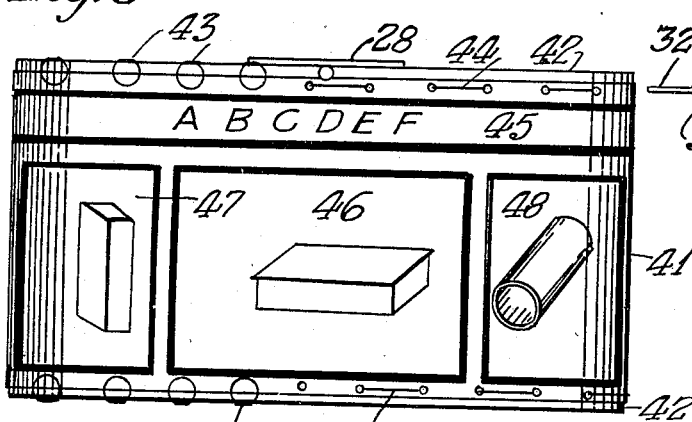
Figure 7:
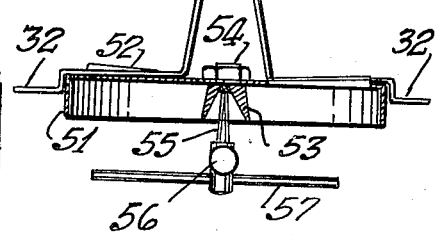
Figures 5, 8:
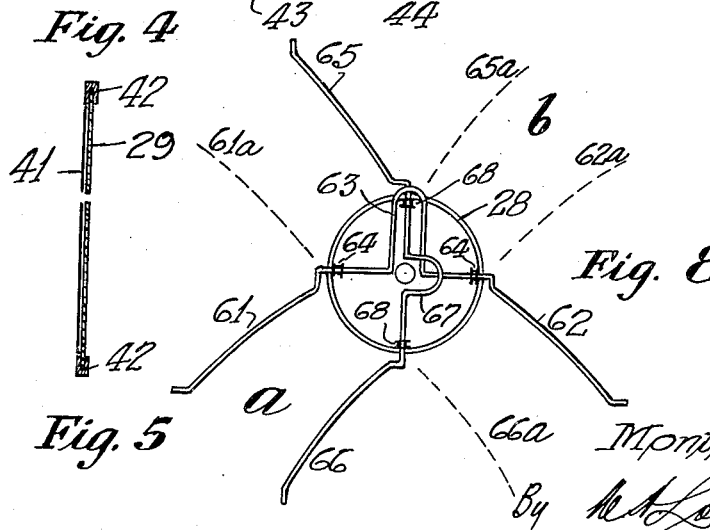

This invention relates to an advertising device which appeals to the eye by a combination of colors, moving objects and shape and has for an object to provide a device of this class which is attractive, holds attention, produces continuing optical illusions and displays advertising matter in an attractive form. The device is comparatively inexpensive to construct and operate and the advertising and color effects can readily be changed. These and other objects of the invention will be more fully understood from the following specification and the accompanying drawings in which Fig. 1, shows a complete device embodying my invention, Fig. 2, is a sectional elevation of the device, Figs. 3 and 4 show the advertising cylinder used in the lower section of the device, Fig. 5 is a cross-section of the wall of the advertising cylinder, Fig. 6 is the color cylinder, Fig. 7 shows the details of the rotating mechanism, and Fig. 8 shows a method of collapsing the arms supporting the silhouette.

This invention is designed to appeal to the eye by a novel shape consisting of a globe surmounting a cylinder. The globe is made from frosted glass and the cylinder is made from frosted glass. An incandescent light in the centre of the globe and another light in the centre of the cylinder illuminates these parts. A transparent colored cylinder rotates about each light throwing a colored shadow upon the globe and the cylinder which produces an attractive illusion and makes these parts appear as if they were actually rotating. Another rotating element outside the color cylinder carries the desired advertisement which is reflected upon the glass surface of the globe or upon the cylinder thereby providing a continuously changing and attractive advertisement.

The globe part of the device may be arranged to represent a cloudy sphere with objects floating therethrough, such as birds, airplanes, etc., and which move into and out of vision as these objects move between the observer and the source of light. This part of the device directs attention to the cylinder below where the advertising cylinder is moving between the observer and the source of light and constantly bringing new objects to view.

The advertising cylinder is preferably constructed with the advertisements in panels each directed to a different subject and a continuous advertisement may be placed on this cylinder in the form of a slogan which requires a revolution of the cylinder to complete the slogan. An observer thus reading the slogan will have all of the advertising panels brought into view and the objects in the globe compel attention. The rotating parts are balanced and mounted upon jewel bearings.

Referring to the drawings, 11 is the frosted cylindrical glass of the base which rests upon the wooden base 12 and is provided with the removable cover 13. This cover supports the ring 14 upon which the frosted globe 15 seats. This makes the superstructure of the device.

Through an aperture in the base 12, the bracket for the socket 21 extends. This socket supports the bulb 22 and the flanged ring 23 to which the wire frames 24 and 25 are soldered. Frame 24 supports the colored cylinder 26 through the vane 27, hereafter described in greater detail and the frame 25 through the vane 28 and wires 30 supports the advertising cylinder 29. It will be noted that the colored cylinder 26 rotates close to the source of light and the advertising cylinder 29 rotates close to the glass cylinder 11. These parts are rotated by convection currents of air caused by the heat from lamp 22 passing through vane 27 and through vane 28 in the axial plane of the lamp bulb.

The bracket 31 secured to the cover 13 supports a lamp bulb 22 with frames and colored cylinder similar to that described and indicated by corresponding reference numerals. The frame 25 supports a vane 34 which carries the wires 32 to which the silhouettes 33 are fastened. These silhouettes rotate close to the globe and are balanced on the pivot. Advertising matter may be stenciled on these silhouettes or they may be formed to represent some animal or object such as a bird or airplane. The vane 34 with its associated parts are obviously larger than the opening in the base of the globe and they must be positioned after the globe is placed on its seat. This is secured by inserting the vane when the globe is removed, bringing a hook through opening 36 to engage with eye 35. This hook holds the vane 34 close to the top of the globe until it is in place when the vane is lowered on the bearing and the hook is released. When the globe is afterwards removed the vane 34 is raised by the hook in the manner just described before the globe is removed from its seat. The construction of the globe mechanism is on the lines disclosed in application 611,501 in the name of Barker & Read to which reference is made by permission.

The advertising cylinder 29 is constructed of a thin sheet of transparent material such as pyroxylin reinforced by metallic bands 42 at top and bottom and carried on the four wires as indicated in Fig. 3. This material has a smooth surface to which the advertising characters cannot readily be secured by an adhesive as the adhesive does not readily take the smooth surface unless it is a solvent of the material. This would change the transparency of the cylinder and result in blotches on the frosted glass. I have overcome this difficulty by using a transparent band upon which the advertising display is arranged and then the band is secured to the outside of the advertising drum. Silk webbing has been found a suitable material for this purpose where the fibres are so fine that they do not obstruct the light and do not show on the frosted glass. This webbing 41 is secured at top and bottom to the cylinder 29 by lacing as indicated at 44 or it may be secured by ordinary wire clips as indicated at 43; the attachment being such that it can readily be replaced.

The webbing forms the foundation upon which the advertisement is arranged. The arrangement shown in Fig. 4 has a continuous band 45 around the top of the cylinder upon which the letters A. B. C. etc., may represent an advertising slogan spread around the cylinder. The panels 46, 47 and 48 represent divisions of the cylinder which may be used or rented to advertisers of different products. As this cylinder slowly rotates each panel is brought into display and the reading matter of the slogan holds attention until the cylinder makes a complete revolution.

The color cylinder is illustrated in Fig 6 in which 26 is made from a transparent material and preferably a material which is not injured by heat. The top is reinforced by the flange 51 of the vane and the bottom is reinforced by the metal band 63. This cylinder is colored as indicated by the stripes 61. When a cloud effect is desired the color patches have an irregular contour and as this cylinder rotates close to the source of light a colored beam is thrown on the frosted globe or cylinder which creates the illusion of a rotating colored cylinder. The cylinder 26 has a number of holes 62 scattered over its surface. These holes allow an unobstructed beam of light to pass to the frosted glass which creates the effect of a white cloud moving with the other color effects.

The vane is constructed as shown in Fig. 7 from sheet stock with the flange 51 and the vanes 52 arranged as shown in Fig. 3. In the centre of the vane the cup-shaped bearing 53 is provided secured by the nut 54. A jewel is provided in the apex of this bearing which rests on the point of the needle 55 secured by the screw 56 to the socket which is supported by the frame 27. Phonograph needles have been found satisfactory for this work and are readily replaceable when worn. The use of jewel bearings contribute very materially to the reliability of this device and as all the wear is on the needle replacement on account of wear is a simple matter. In Fig. 7, it will be observed that wire 32 is formed into a loop 35ª by means of which the vane is held to the globe when assembling.

As the silhouettes and advertising cylinder rotate close to the frosted glass a sharp definition of the object is thrown on the glass. The objects themselves may be colored transparencies as desired.

It will be noted that each of the elements rotate quite independently of each other, therefore they may rotate at different speeds or in different directions. The top elements may rotate in opposite directions to the bottom elements thus securing a great variety of combinations which can be adapted to a great variety of purposes.

In the construction shown in the upper part of Fig. 2, a pair of arms 32 and a pair of silhouettes 33 are used. It is obvious that four silhouettes with a pair of crossed arms similar to 32 may be used but a special arrangement is necessary in order to insert a construction of this kind into the globe. Such an arrangement is illustrated in Fig. 8 where the arms are off-set and pivotally secured to the vane. The arms 61 and 62 are pivoted at 64 to the vane and are formed integral with the loop 63 by means of which the device is placed on the bearing as described. At right angles, the arms 65 and 66 are pivoted to the vane at 68 and are formed integral with the loop 67 which falls within the loop 68. In the position shown it will be noted that arms 61 and 66 are turned toward each other at a so that they may be inserted through the bottom opening of the globe. After inserting these arms and the vane, they are then rotated and assume the position indicated by the dotted lines. This brings 65 to the position 65ª and 62 to the position 62ª enabling these arms to pass through the opening in the globe so that the vane may be positioned on the bearing when the globe is placed in position. In this position the ends of the arms fall into the vertical plane and are equally spaced around the vane.

It will be noted from Fig. 2 that as the globe 15 is raised from the cover 13 that the lamp bulb 22, the cylinder 26 and the frame 25 supported by 31, pass through the opening in the base of the globe while the arms 25 remain within the globe. These arms are removed through the opening in the base of the globe by folding them towards each other.

Having thus described my invention, I claim:

1. In an advertising device of the class described, the combination of a lamp bulb, a pivot located in the axial plane of said bulb, a vane rotating on said pivot, two arms, each having an intermediate portion overlying said vane and a downward extending offset adjacent each end and a display object at each outer end, said arms crossing each other at said vane, a cover for said vane having an aperture for the insertion of said arms, said arms when turned on their pivots towards each other clearing the aperture in said cover.

2. In an advertising device of the class described, the combination of a lamp bulb, a pivot located in the axial plane of said bulb, a vane rotating on said pivot, two arms, each having an intermediate portion overlying said vane and a downwardly extending offset adjacent each end, a loop in the centre of the intermediate portion and a display object at each outer end, said arms crossing each other at the loops, one loop turning within the other and a cover for said vane having an aperture for the insertion of said arms.

3. In an advertising device of the class described, the combination of a lamp bulb, a pivot located in the axial plane of said bulb, a vane rotating on said pivot, two arms, each having an intermediate portion overlying said vane and a downwardly extending offset adjacent each end, a display object at each outer end and a loop in the centre of one of said arms maintained in the vertical position by gravity, and a cover for said vane having an aperture in register with said loop.

Signed at New York in the county of New York and State of New York this 28th day of November A. D. 1923.

MONTAGUE ADAIR.